United States Patent [19]

Friebel

[11] 3,982,436

[45] Sept. 28, 1976

[54] FLUID-VOLUME MEASURING APPARATUS

[75] Inventor: Eberhard Friebel, Berlin, Germany

[73] Assignee: Siemens Aktiengesellschaft, Munich, Germany

[22] Filed: June 12, 1975

[21] Appl. No.: 586,163

[30] Foreign Application Priority Data

June 28, 1974 Germany............................ 2431752

[52] U.S. Cl. ................................................. 73/233
[51] Int. Cl.² .......................................... G01F 1/08
[58] Field of Search ...................................... 73/233

[56] References Cited
UNITED STATES PATENTS

| | | | |
|---|---|---|---|
| 3,308,663 | 3/1967 | Short | 73/233 |
| 3,710,624 | 1/1973 | Kugler | 73/233 |
| 3,745,827 | 7/1973 | Swanson | 73/233 |

FOREIGN PATENTS OR APPLICATIONS

| | | | |
|---|---|---|---|
| 567,158 | 12/1958 | Canada | 73/233 |
| 1,225,402 | 9/1966 | Germany | 73/233 |

Primary Examiner—Herbert Goldstein
Attorney, Agent, or Firm—Kenyon & Kenyon Reilly Carr & Chapin

[57] ABSTRACT

The invention relates to a fluid-volume measuring apparatus with a device for temperature-dependent volume conversion. The device contains a temperature sensor with a plunger attached to the fluid-volume measuring apparatus, a motion-transmitting device acted upon by the temperature sensor and a regulating transmission, controlled by the motion-transmitting device and forming part of a summing mechanism driven by the volume-measuring apparatus. The motion-transmitting device includes a carriage movable transversely to the direction of motion of the plunger of the temperature sensor and transversely to the linkage of the regulating transmission. The movable carriage has inclined cam surfaces interacting with a temperature sensor and the regulating transmission. The contours of the cam surfaces are configured with regard to the dependence of the coefficient of thermal expansion of the fluid to be measured on the particular liquid temperature. The cam surfaces are formed either directly by the edges of the carriage or by control members supported by the carriage.

12 Claims, 3 Drawing Figures

FLUID-VOLUME MEASURING APPARATUS

BACKGROUND OF THE INVENTION

The invention relates to a fluid-volume measuring apparatus with a device for temperature-dependent volume conversion containing: a temperature sensor with a plunger attached to the fluid-volume measuring apparatus, a motion transmitting device acted upon by the temperature sensor, and a regulating transmission, controlled by the motion-transmitting device and forming part of a summing mechanism driven by the fluid-volume measuring apparatus.

In a liquid-volume measuring apparatus of this kind disclosed in Siemens Zeitschrift, 1961, pages 378 to 380, the motion transmitting device consists essentially of a lever, engaged at one end by the plunger of the temperature sensor; the other lever end interacts with the linkage of a regulating transmission configured in the form of a friction wheel drive. The lever is fulcrumed approximately in its center, its fulcrum being moveable as a function of the coefficient of thermal expansion of the liquid flowing through the liquid-volume measuring apparatus at a particular time. This construction of the motion transmitting device enables a volume measurement of liquid to be taken referred to a specified temperature, because the regulating transmission, with the cooperation of the temperature sensor and the motion-transmitting device, sees to it that the volume, measured in excess for example as when the liquid temperature exceeds the specified temperature, is reduced to the correct value referred to the specified temperature.

The same characteristics are present in another liquid flow meter with a summing mechanism shown in Deutsche Auslegeschrift 1,200,003 where the motion-transmitting device contains a lever system whose one lever, cooperating with another lever, can be varied as to its effective length as a function of the prevailing liquid temperature. Because of the use of several levers, this motion-transmitting device is relatively costly, but it has the advantage that the response to the change in liquid volume measured is relatively accurate, the change in volume being caused by a temperature of the liquid deviating from the specified temperature. A set screw to change the length of the other lever appropriately is provided to adjust the motion transmitting device to the mean coefficient of expansion of the particular liquid.

The known liquid-volume measuring apparatus do not take into account the circumstance that, in many liquids, the coefficient of thermal expansion as a function of the liquid temperature is not constant; this applies particularly to liquid gases whose expansion characteristic is not linear. For this reason, temperature sensors have already been used with a liquid corresponding to the liquid to be measured. But this method entails the disadvantage that an accurate temperature compensation is provided only for that liquid to be measured which is in the temperature sensor.

Accordingly, it is an object of the invention to provide a fluid-volume measuring apparatus which successfully makes possible, at relatively low cost, a temperature-dependent volume conversion. It is also an object of the invention to provide such a temperature-dependent volume conversion also when the expansion characteristic of the fluid to be measured is not linear.

SUMMARY OF THE INVENTION

The motion-transmitting device of a fluid-volume measuring apparatus of the type described above includes a carriage which is movable transversely to the direction of motion of the plunger of the temperature sensor and transversely to the linkage of the regulating transmission. The carriage has inclined cam surfaces interacting with the temperature sensor and the regulating transmission; the contours of the cam surfaces are configured with regard to the dependence of the coefficient of temperature expansion of the fluid to be measured on the temperature of the fluid.

The primary advantage of the fluid-volume measuring apparatus according to the invention is that the variation of the coefficient of thermal expansion deviating from a linear expansion characteristic can be taken into account merely by appropriate configuration of the cam surfaces of the carriage. All that is required to accomplish this is to: configure the cam surfaces accordingly, and arrange them on the carriage or provide for a match to the different fluids by making them exchangeable.

The cam surfaces of the fluid-volume measuring apparatus according to the invention may be formed by the edges of the carriage itself; this requires carriages to be exchangeable if the expansion characteristics of fluids to be measured are different, this beng tolerable from a cost point of view.

It is more advantageous, however, if the carriage supports control members, one edge of each forming the cam surfaces of the carriage. If advantageously, at least one control member is adjustable, it will then be sufficient in many cases to adjust only this control member appropriately as far as its cam surfaces are concerned in order to take into account the different expansion characteristics.

The cam surfaces can be configured differently. If the fluid to be measured is a fluid with a linear expansion characteristic, the cam surfaces are configured as straight lines.

If, on the other hand, the expansion characteristic of the fluid to be measured is not linear, one cam surface is advantageously straight, and the other cam surface is shaped with regard to the dependence of the fluid to be measured on the temperature of said fluid. The advantage of this embodiment is that only the control member supporting the other cam surface need be exchanged, if a fluid having a different expansion characteristic is used. In this embodiment, it is a simple matter to change the transmission ratio of the regulating transmission by adjusting the control member having the straight cam surface.

Although the invention is illustrated and described herein as a fluid-volume measuring apparatus, it is nevertheless not intended to be limited to the details shown, since various modifications may be made therein within the scope and the range of the claims. The invention, however, together with additional objects and advantages will be best understood from the following description and in connection with the accompanying drawing.

DESCRIPTION OF THE PREFERRED EMBODIMENTS OF THE INVENTION

Figures 1, 1A:
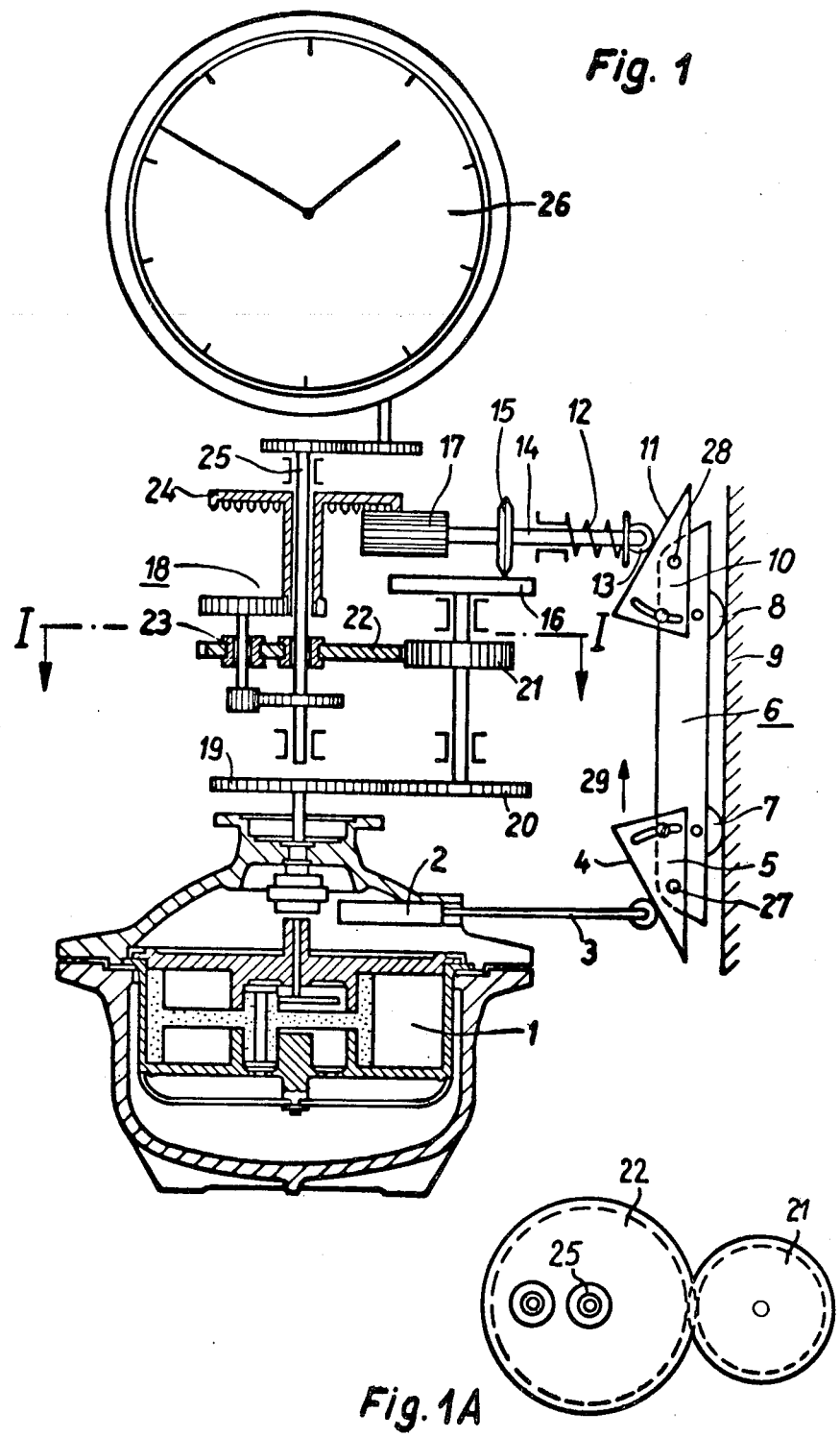
FIG. 1 is a schematic diagram of the fluid-volume measuring apparatus containing a motion-transmitting arrangement according to the invention. The carriage is shown equipped with straight cam surfaces.
FIG. 1A is a plan view taken along line I—I of FIG. 1 and shows the interaction of a portion of the gear train of the summing gear arrangement.

FIG. 1 illustrates a fluid-volume measuring apparatus constructed in the form of a rotary piston meter wherein temperature sensitive actuation means in the form of a temperature sensor 2 with a plunger 3 is disposed in its chamber through which a liquid to be measured flows. The plunger 3 pushes against a cam surface 4 of a control member 5 constituting a first cam means, the control member 5 being mounted on a carriage 6. The carriage 6 is provided with wheels 7 and 8 by means of which it can be guided along a wall 9.

The other end of the carriage 6 carries second cam means in the form of another control member 10 which is provided with another cam surface 11. Linkage means comprising a linkage 14 equipped with a roller 13 at its end is pushed against the other cam surface 11 by a spring 12. A friction wheel 15 is rotatably mounted on the linkage 14 at a preselected location.

Together with a friction disc 16 and a spur gear 17, the friction wheel 15 forms part of a regulating transmission, which is a component of a summing mechanism 18. The summing mechanism 18 is also driven directly by the fluid-volume measuring apparatus through the spur gears 19, 20, 21 and 22. In conjunction with a planetary gear 23 driven by the spur gear 22 and a crown gear 24 meshing with the spur gear 17, a shaft 25 drives a dial indicator 26.

As may further be seen from FIG. 1, the cam surfaces 4 and 11 of the respective control members 5 and 10 of the carriage 6 are formed as straight edges. The control members 5 and 10 can also pivot about pivot points 27 and 28 so that the inclination of the cam surfaces 4 and 11 can be changed in accordance with the expansion characteristic of the particular liquid. Therefore, the control members 5 and 10 with their straight cam surfaces 4 and 11 effect a satisfactory volume conversion, and hence show an indication corrected to a reference temperature on the dial indicator 26 provided the expansion characteristic of the fluid to be measured is linear. In such a case, the carriage 6 is pushed more or less far in the direction of the arrow 29 by the plunger 3 in accordance with the actual temperature so that the linkage 14 with the friction wheel 15 is pushed more or less toward the center of the friction disc 16 thereby initiating a change in the transmission ratio of the regulating transmission which brings about the volume conversion.

Figure 2:
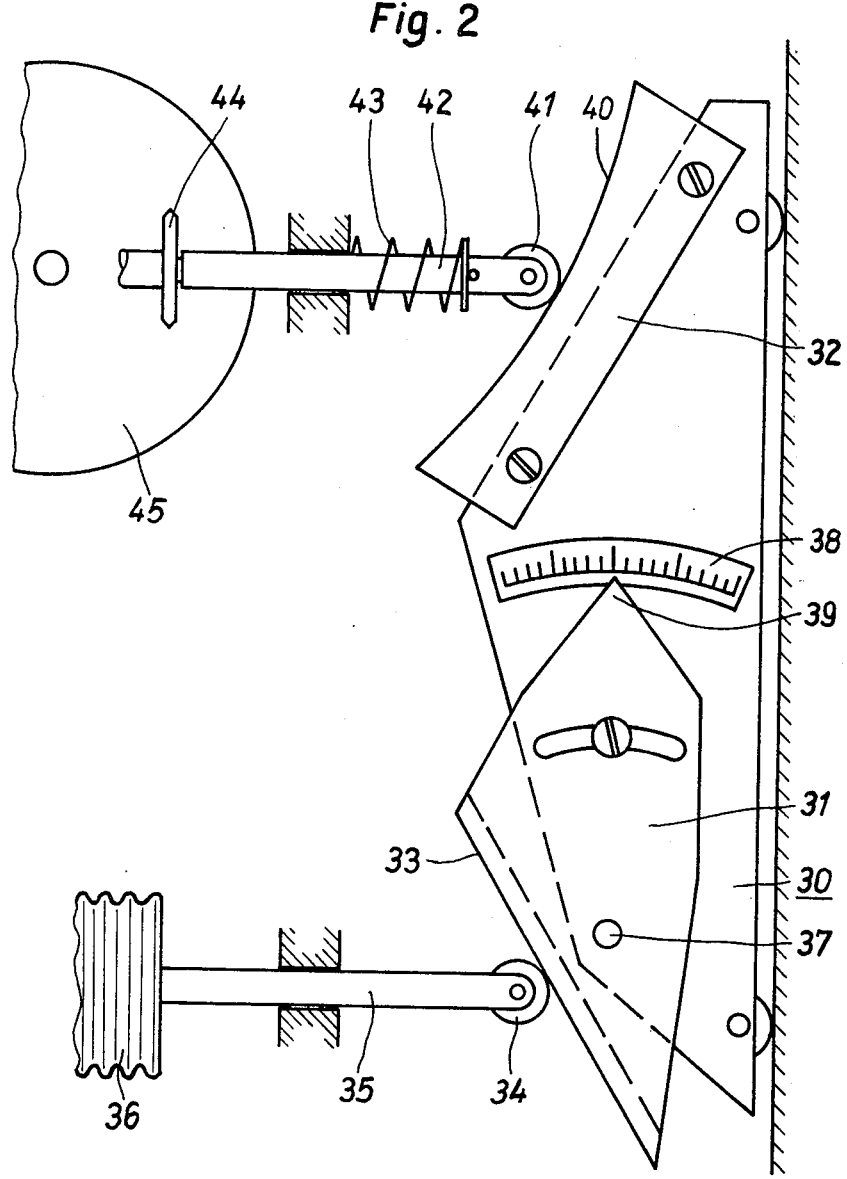
FIG. 2 is a schematic diagram showing only components of the fluid-volume measuring apparatus pertaining to the motion-transmitting arrangement. Here another embodiment of the motion-transmitting arrangement is shown wherein the movable carriage is equipped with control members having contoured control edges different from each other.

Referring now to the embodiment of the invention shown in FIG. 2, a carriage 30 is provided with control members 31 and 32 of differing configuration. The one control member has a straight cam surface 33, against which a wheel 34 of a plunger 35 of a temperature sensor 36 pushes. The control member 31 can pivot about a pivot point 37 so that a mean transmission ratio according to the expansion characteristic of the particular fluid to be measured can be adjusted. The adjustment to the mean transmission ratio necessary in a given case can be made on a scale 38, along which a pointer 39 of the control member 31 slides.

The other control member 32 of the carriage 30 has a concave cam surface 40 in order to take a nonlinear expansion characteristic into account. Along the cam surface 40 runs a roller 41 of a linkage 42 which is being pushed against the cam surface 40 by a spring 43. The linkage 42 carries a friction wheel 44 which interacts with a friction disc 45 and causes, — as already described in detail in connection with the description of FIG. 1 — through a summing mechanism not shown in FIG. 2, the liquid volume to be indicated uninfluenced by different temperatures of the liquids flowing through the fluid-volume measuring apparatus.

If liquids having different, nonlinear expansion characteristics are to be measured, all that is needed is to replace the other control member 32 by a control member having a different, appropriately shaped cam surface 40.

The fluid-volume measuring apparatus according to the invention is capable of taking into account also nonlinear expansion characteristics of fluids to be measured as a function of the actual prevailing fluid temperature so that a very accurate conversion of the volume measured can be effected.

What is claimed is:

1. In a fluid-volume measuring apparatus equipped with a device for converting volume in dependence upon temperature, the device including: a summing gear arrangement having a controllable regulating transmission, and a motion transmitting arrangement for controlling the regulating transmission, the motion transmitting arrangement comprising: temperature sensitive actuation means for moving a plunger in response to changes in temperature of the fluid being measured; a movable carriage movable along a path transverse to the direction of movement of said plunger; said carriage having first cam means defining a control edge for receiving said plunger in engagement therewith whereby said carriage moves along said path in dependence upon the movement of said plunger; and, linkage means arranged transverse to said path for controlling the regulating transmission; said carriage having second cam means defining a control edge for acting on said linkage means in response to the movement of said carriage along said path, said control edges each having a contour selected with regard to the dependence of the temperature expansion coefficient of the fluid to be measured on the temperature of said fluid.

2. The motion transmitting arrangement of claim 1, each of said control edges being linear.

3. The motion transmitting arrangement of claim 1, one of said control edges being linear, and the other one of said control edges being formed with regard to the dependence of the temperature expansion coefficient of the fluid to be measured on the temperature of said fluid.

4. The motion transmitting arrangement of claim 1, each of said cam means being an edge of said carriage.

5. The motion transmitting arrangement of claim 4, each of said control edges being linear.

6. The motion transmitting arrangement of claim 4, one of said control edges being linear, and the other one of said control edges being formed with regard to the dependence of the temperature expansion coefficient of the fluid to be measured on the temperature of said fluid.

7. The motion transmitting arrangement of claim 1, said first and second control means being respective control members mounted on said carriage, said control members defining corresponding ones of said control edges.

8. The motion transmitting arrangement of claim 7, each of said control edges being linear.

9. The motion transmitting arrangement of claim 7, one of said control edges being linear, and the other one of said control edges being formed with regard to the dependence of the temperature expansion coefficient of the fluid to be measured on the temperature of said fluid.

10. The motion transmitting arrangement of claim 7, at least one of said control means comprising means for adjusting the position of the control member thereof.

11. The motion transmitting arrangement of claim 1, each of said control edges being linear.

12. The motion transmitting arrangement of claim 1, one of said control edges being linear, and the other one of said control edges being formed with regard to the dependence of the temperature expansion coefficient of the fluid to be measured on the temperature of said fluid.

* * * * *